(No Model.) 2 Sheets—Sheet 1.

G. E. HIBBARD.
VALVE FOR AUTOMATIC FIRE EXTINGUISHERS.

No. 531,119. Patented Dec. 18, 1894.

Witnesses
J. Halpenny
W. Crow

Inventor
George E. Hibbard
By his attorneys,
Crosley & Hopkins (No Model.) 2 Sheets—Sheet 2.

G. E. HIBBARD.
VALVE FOR AUTOMATIC FIRE EXTINGUISHERS.

No. 531,119. Patented Dec. 18, 1894.

Witnesses:
J. Halpenny.
W. T. Crow

Inventor:
George E. Hibbard
By his attorneys
Gridley & Hopkins

UNITED STATES PATENT OFFICE.

GEORGE E. HIBBARD, OF CHICAGO, ILLINOIS.

VALVE FOR AUTOMATIC FIRE-EXTINGUISHERS.

SPECIFICATION forming part of Letters Patent No. 531,119, dated December 18, 1894.

Application filed December 24, 1892. Serial No. 456,256. (No model.)

*To all whom it may concern:*

Be it known that I, GEORGE E. HIBBARD, a citizen of the United States, residing at Chicago, in the county of Cook and State of Illinois, have invented certain new and useful Improvements in Valves for Automatic Fire-Extinguishers, of which the following is a specification, reference being had to the accompanying drawings, which are made a part hereof, and in which—

Figure 1:
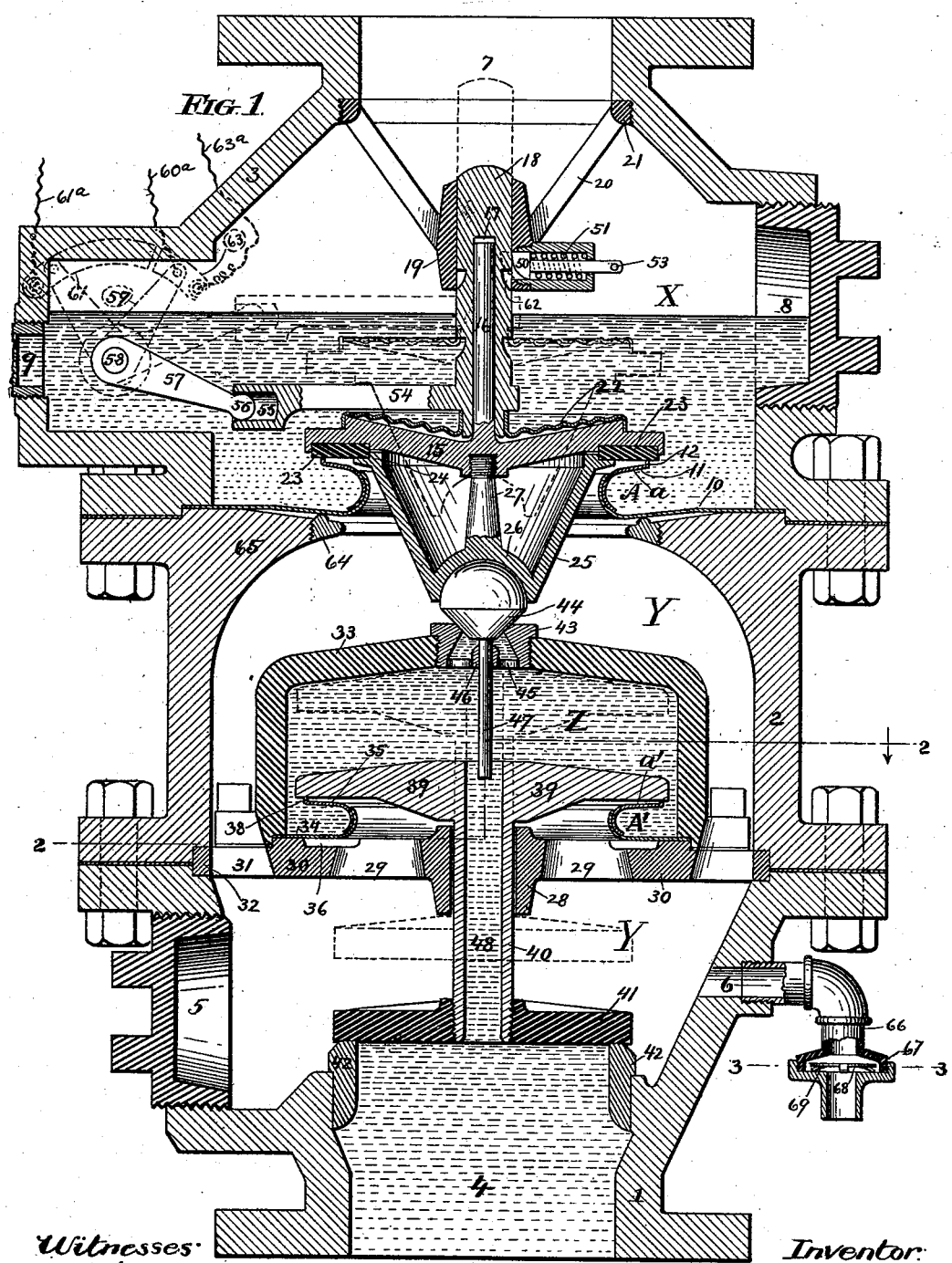
Figure 2:
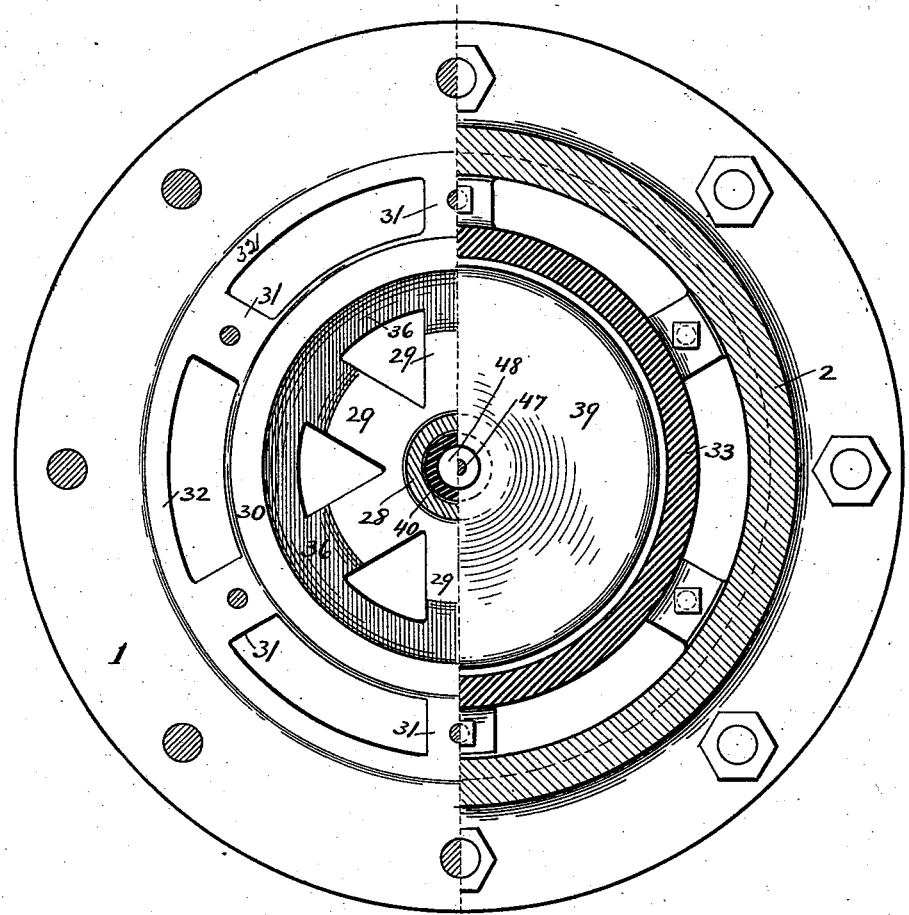
Figure 3:
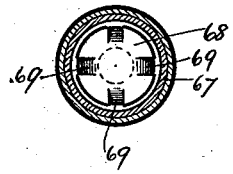
Figure 4:
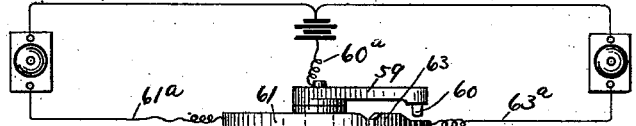
Figure 5:

Figure 1, is a sectional elevation of a valve embodying the invention. Fig. 2, is a horizontal section thereof on the line 2—2. Fig. 3, is a horizontal section of the casing of the drain pipe valve, on the line 3—3. Fig. 4, is a view showing in detail the contact points of the alarm apparatus. Fig. 5, is a section of a valve-supporting ring, under a slight modification.

The object of the invention is to improve valves of the character that are used in automatic fire extinguishers and said invention consists in certain features of novelty that are particularly pointed out in the claims hereinafter.

The valve casing preferably consists of three parts, 1, 2, and 3, secured together by any suitable means, as for example, by bolts passing through flanges on their meeting edges. The part 1 has an opening 4, which communicates with the water supply pipe, and constitutes the inlet of the valve casing. It has also a hand hole closed by a removable screw plug 5, and a drain opening 6. The part 3 has an opening 7, which communicates with the distributing pipe of the system and constitutes the outlet of the casing. It has also two hand holes closed by removable screw plugs, 8 and 9, respectively.

Fig. 5 shows an axial section of a ring made of flexible sheet metal and having its inner margin $a$ reflexed. This reflexed portion may be dressed to form a valve seat, or a valve seat may be secured to it. As shown in this figure the ring is made of a single piece of metal, and while this may be done, I prefer to make it of two pieces, secured together in some suitable manner.

In Fig. 1, 10 and 11 are two annular plates, each having its inner margin slightly reflexed, so that the one fits snugly over the other, said margins being firmly united in some suitable way, (preferably brazed or soldered) so that the two plates become practically a single element, or ring A, the reflexed margin $a$ of which is formed by the plate 11. The outer margin of the ring is clamped between the parts 2 and 3 of the casing, while its inner reflexed margin is provided with a short flange 12, which constitutes the seat proper of a valve 15. When the ring A is thus secured in place it performs the double office of a diaphragm dividing the interior of the casing into two chambers, X and Y, and a yielding support for the seat of the valve 15. This valve is concave on its top side, and has a stem 16 loosely fitting in a closed socket 17, formed for it in a longitudinally movable stem 18. This stem 18 fits in and is guided by a short sleeve 19 supported by radiating arms 20, the outer ends of which join a ring 21, which is secured to the part 3 of the casing. The lower open end of the stem 18 is secured to a corrugated diaphragm 22, the outer margin of which is secured to a raised portion of the valve 15.

In the under side of the valve 15 is an annular groove or rabbet, in which fits a packing ring 23 clamped between the said valve and the base of an inverted hollow cone 25, the truncated end of which is provided with a hemispherical socket 26, and within which is a central stem 27 tapped into the under side of the valve.

Between the parts 1 and 2 is clamped the marginal ring of a spider which comprises a central sleeve 28, arms 29 radiating therefrom, a ring 30, arms 31 radiating therefrom, and the marginal ring 32. To this spider is bolted a hollow dome 33, the lower margin of which rests upon the ring 30. Between the dome and ring is clamped the outer margin of a flexible ring A', the inner margin $a'$ of which is reflexed and provided with a seat 38 for a valve 39. This ring may be constructed of a single piece of metal, or of two separate annular plates 34 and 35, secured together as already described with reference to the plates 10 and 11. The valve 39 is located in the chamber Z of the dome and is secured to a stem 40 which passes through and is guided by the sleeve 28. To this stem is also secured a valve 41 which is located in the chamber Y and when resting upon its seat 42 closes the inlet 4.

Through the top of the dome 33 is an opening, and in this opening is screwed a ring 43 upon which is formed a seat for a valve 44, and with which is cast a spider 45 supporting a central sleeve 46, through which the stem 47 of said valve passes and by which said stem is guided. The top side of the valve 44 is hemispherical and normally fits in a corresponding socket 26 formed for it in the cone 25. The full lines in Fig. 1 show the parts in the positions that they occupy when the valve is set and in readiness for action. The air in the chamber X is under the same pressure as the air in the distributing pipes of the system. The air in the chamber Y is under atmospheric pressure, and the water in chamber Z is under the same pressure as the water in the supply pipe, said chamber being in open communication with said supply pipe through the passage way 48 formed in the valve stem 40. So long as the valve 44 remains seated, the downward pressure upon the valve 39 will be in excess of the upward pressure, and the valve 41 will be held seated with a force equal to this excess. It will be seen that the pressure of the water on the under side of the valve 41 is transmitted to the valve 39 through the stem 40 and that in addition to this upward pressure upon the said valve 39, there is the upward pressure of the water beneath its periphery, and beneath the reflexed margin $a'$ of the ring A'. The whole of the upward pressure against the margin $a'$ does not reach the valve, as a portion of it is necessarily consumed in deflecting the ring. With this construction, the pressure of the fluid in opposite directions against the valve and its seat tends to force them toward each other, and hence the greater the pressure the tighter will be the joint between them.

With the construction shown in the drawings the seat may move to any extent to accommodate itself to the position of the valve and no amount of pressure upon said seat can force it away from the valve. This is due to the fact that the support for the seat extends inward from said seat and hence any fluid pressure upon said seat or its support tends to force the seat toward the valve. As shown in the drawings, the reflexed inner margin of the ring constitutes the immediate support for said seat, while the balance of the ring constitutes the support for this margin. It will be seen that if all of this ring, except the reflexed inner margin were rigid, the same results would follow, but to a less extent. I prefer that the whole ring should yield, and in order to permit this, the ring 30 is chambered as shown at 36. Since the water in the chamber Z is constantly in contact with and exerting an upward pressure upon the bottom of the valve 44, as great a pressure is of course required for holding said valve seated. The pressure for this purpose is derived from the chamber X and transmitted to the valve 44 through the valve 15 and the cone 25. Normally the pressure in this chamber is sufficient to hold the valve 15 and its accessories in the positions shown by full lines. Upon the firing of a head the pressure decreases to such an extent that notwithstanding the greater superficial area of the top side of the valve 15, as compared with the under side of the valve 44, the pressure of the water against said valve 44 forces it up, the valve 15 and its accessories going with it. The water thereupon escapes from the chamber Z and relieves the pressure upon the top side of the valve 39. There is then scarcely any resistance to the upward movement of the valve 41, and so the pressure of the water in the supply pipe carries it up to the position indicated by dotted lines (the valve 39 going with it) uncovering the inlet and admitting water to the chamber Y. The water rushes upward through this chamber, passing between the arms 31 of the spider and into the chamber X and thence through the outlet 7 to the distributing pipe. If the pressure of the water against the under side of the valve 44 was not sufficient to carry the valve 15 and its accessories quite up to the positions indicated by dotted lines, certainly the pressure of this great volume of water rushing through the casing and impinging against the cone and the under side of the valve will be. When in this position a latch 50 actuated by a spring 51 enters a notch 52 in the stem 18 and holds the valve and its accessories in the dotted positions until an attendant returns them. This may be done by removing the cap 8 giving access to the interior of the chamber X, and withdrawing the latch. by a pull upon its stem 53.

As the parts move to the position shown by dotted lines an electrical alarm circuit is closed by the following mechanism: 54 is an arm projecting from the stem 18 and having at its extremity a socket 55 in which fits a ball 56 carried at the end of an arm 57 that projects from a shaft 58. To this shaft is secured a second arm 59 which carries a contact plate 60 with which the battery wire 60$^a$ is connected and within the path traveled by this contact plate is located the second contact plate 61, with which is connected the wire 61$^a$ including a fire alarm bell.

It sometimes happens that somewhere in the system there is a bad joint through which a slight amount of air can escape. The leakage may be so slight as to require a long time to produce any appreciable decrease in the pressure within the system, but even with the slightest leakage, the pressure in the system will in time fall to an ineffectual point. It is therefore desirable to provide every system with what is known as a "low air alarm," and I have embodied one in the present apparatus. The construction of some of its parts has already been described, and the other parts will be understood from a description of its operation. When the parts are in the positions shown by full lines in Fig. 1, the first effect of a slight decrease in the pressure in the chamber X is a rising of the diaphragm 22. The normal shape of this diaphragm is flat (as shown by dotted lines) and it is only because of the pressure upon it that it assumes approximately the shape of the top side of the valve. Hence as the pressure decreases the diaphragm rises, independently of the valve. In doing so it carries the stem 18 and its accessories up with it and when it has regained its normal shape it will have lifted the stem 18 high enough for the latch 50 to engage a notch 62 in the said stem and hold it. In rising the stem carries with it the arm 54 and the upward movement of said arm moves the arm 59 in the manner already described, only under the conditions now being described it is not moved so far as when a head is fired. Under said conditions it moves only far enough to bring the contact plate 60 into contact with a third plate 63 which is insulated from the plate 61 and is connected with wire 63ª which includes a "low air alarm" bell.

64 is an adjustable ring screwed to a flange 65 of the casing, and bearing against the underside of the ring A. By moving this ring 64 upward the pressure of the ring A against the valve is increased, and by moving it downward the pressure is decreased, and in this way the valve may be adjusted to fire at any desired pressure. The pressure of the ring A against the valve may thus be made so great that the valve will fire if the pressure is reduced by only one pound, and on the other hand, it may be made so slight that a very much greater reduction must take place before the valve fires.

Communicating with the drain opening 6 is a pipe 66 in which is incorporated a valve casing 67. In this casing is located a check valve 68 which is normally supported above its seat by delicate springs 69. As shown in the drawings the valve consists of a disk of thin metal and the springs are integral with it, each being formed by making two slits in the margin of the disk and bending down the resulting tongue of metal. With this arrangement, should a small quantity of water leak into the chamber Y, and reach the drain opening 6, it will flow through the pipe 66, past the valve 68 and out. A small quantity of water may pass the valve in this way without seating it, but if a considerable quantity reaches the valve as will be the case upon the unseating of the valve 41, the pressure of it upon the top side of the check valve 68 will be sufficient to seat said valve, in opposition to the force of its supporting springs 69 and thus close the pipe 66.

Having thus described my invention, what I claim as new therein, and desire to secure by Letters Patent, is—

1. The combination with a valve and a seat therefor, of a flexible ring carrying said seat and extending inward beneath the valve, the valve being movable toward and from the seat, substantially as set forth.

2. The combination of a casing, a valve located therein, a flexible ring having its inner margin reflexed, and a valve-seat carried by the reflexed portion of said ring, substantially as set forth.

3. The combination with a casing, a valve located therein, and a flexible valve supporting ring, of means for adjusting the pressure of said ring against the valve, substantially as set forth.

4. The combination with a casing, and a valve located therein, of the flexible ring A having the reflexed inner margin a, and the adjustable ring 64 bearing against the ring A, substantially as set forth.

5. The combination with a casing and a valve, of a flexible valve-supporting-ring having its inner margin reflexed, said ring being formed of two annular plates having their inner margins reflexed and secured together, substantially as set forth.

6. The combination with two movable valves and a rigid stem connecting them, of a seat for each of said valves, and a flexible ring carrying one of said seats and extending inward beneath the valve, substantially as set forth.

7. The combination of a casing having an inlet and an outlet and having chambers Y and Z, the latter being in open communication with the water supply and having two openings, a valve controlled by the pressure in the system for controlling one of said openings, a flexible ring forming a valve seat support surrounding the other of said openings, a valve 39 located in the chamber Z and resting upon said ring, a valve 41 located in chamber Y and closing the inlet, and a stem connecting said valves, substantially as set forth.

8. The combination of a casing having an inlet and an outlet, and having chambers Y and Z, the latter being in open communication with the water supply and having two openings, a valve controlled by the pressure in the system for controlling one of said openings, a flexible ring having a reflexed margin surrounding the other of said openings, a valve 39 located in chamber Z and resting upon said ring, a valve 41 located in chamber Y and closing the inlet, and a stem connecting said valves, substantially as set forth.

9. The combination of a casing having an inlet and an outlet, and having chambers Y and Z, the latter having two openings, a valve controlled by the pressure in the system for controlling one of said openings, a flexible ring having a reflexed margin surrounding the other of said openings, a valve 39 located in chamber Z and resting upon said ring, a valve 41 located in chamber Y and closing the inlet, and a hollow stem 40 connecting the valves 39 and 41 and having a passage way 48 communicating with the chamber Z and the inlet, substantially as set forth.

10. The combination with a casing having the communicating chambers X and Y, of a valve for controlling the opening through which they communicate, a flexible diaphragm arranged on said valve so as to be movable independently of it, an alarm mechanism, and suitable connections between said alarm mechanism and diaphragm, substantially as set forth.

11. The combination with a casing having the communicating chambers X and Y and a valve for controlling the opening through which they communicate, of a flexible diaphragm arranged on said valve, a stem to which said diaphragm is secured, means for sustaining and guiding said stem, an alarm mechanism and suitable connections between said stem and alarm mechanism, substantially as set forth.

12. The combination of a casing having the communicating chambers X and Y, a valve, concave on its top side, controlling the opening through which said chambers communicate, and having a guide stem 16, a flexible diaphragm secured to the top side of said valve, a stem 18 having a closed bore in which the stem 16 fits, the lower end of said stem 18 being secured to said diaphragm, means for guiding the stem 18, an alarm mechanism, and means connecting the alarm mechanism and diaphragm, substantially as set forth.

13. The combination of a casing having communicating chambers X and Y, the valve 15, a flexible diaphragm carried by said valve, two separate alarms, means actuated by the movement of the diaphragm for starting one of said alarms, and means actuated by the movement of the valve for starting the other of said alarms, substantially as set forth.

14. The combination with the casing having the communicating chambers X and Y, the chamber X having an outlet and the chamber Y having an inlet, the valve 15 controlling the opening between which said chambers communicate, and the valve 44 controlling the inlet of the chamber Y, said valve 44 having a spherical top, of a spherical socket 26 in which said valve 44 fits, and means connecting said socket to the valve 15, substantially as set forth.

15. The combination of a casing having the chamber Y, the chamber Z located therein and having two openings communicating with the chamber Y, a valve controlled by the pressure in the system controlling one of said openings, an outward seating valve located in the chamber and closing the other of said openings, and a passage connecting said chamber with the water supply, substantially as set forth.

16. The combination of the casing having an inlet and an outlet and having communicating chambers X and Y, a valve 15 controlling the opening through which they communicate, the dome 33 located in the chamber Y and having two openings, the valve 44 closing one of said openings, a part extending from the valve 15 to the valve 44, a valve 39 located in the chamber Z of the dome and closing its second opening, a smaller valve 41 located in the chamber Y and closing the inlet, and a stem connecting the valve 39 and 41, substantially as set forth.

17. The combination with the casing having the chamber Y and the drain pipe 66, of the valve casing 67, and the valve disk 68 situated therein and having the spring tongues 69 bent downward and resting upon the casing whereby the valve is held normally off of its seat, said disk being slit to form said tongues substantially as set forth.

GEORGE E. HIBBARD.

Witnesses:
L. M. HOPKINS,
J. HALPENNY.